United States Patent Office 3,244,680
Patented Apr. 5, 1966

3,244,680
HIGH STRENGTH ORIENTED ETHYLENE/VINYL
ACETATE COPOLYMER FILM
Harry P. Holladay, St. Louis, Mo., and Ival O. Salyer,
Dayton, Ohio, assignors to Monsanto Company, a corporation of Delaware
No Drawing. Original application Oct. 26, 1959, Ser.
No. 848,551, now Patent No. 3,157,724, dated Nov. 17,
1964. Divided and this application Sept. 15, 1964,
Ser. No. 396,743
1 Claim. (Cl. 260—87.3)

This application is a division of application Serial No. 848,551, filed October 26, 1959, now U.S. Patent 3,157,-724, issued November 17, 1964.

The present invention is directed to clear, high strength oriented films of high molecular weight ethylene/vinyl acetate copolymers containing 10 to 20% by weight of vinyl acetate as copolymerizate, and to the method of obtaining such oriented films. More particularly, the present invention is directed to high strength oriented films of ethylene/vinyl acetate wherein the resulting film is annealed while held in the oriented condition.

An object of the invention is to obtain a film comprised largely of ethylene copolymerizate and having high optical clarity and high impact and tensile strength.

Polyethylene, because of its low cost and good all around properties, is the foremost thermoplastic polymer on the market today. However, a number of improvements in polyethylene films would be desirable—particularly greater clarity and greater strength and toughness.

It has now been discovered that a clear, high strength "modified-polyethylene" film can be prepared under the conditions described herein by orienting a film of high molecular weight ethylene/vinyl acetate copolymer containing 10 to 20% by weight of vinyl acetate.

To prepare the high strength films of the present invention, it is necessary to utilize a suitable ethylene/vinyl acetate copolymer; it is necessary that the copolymer have a vinyl acetate content of about 10 to 20% by weight, and that the molecular weight be high, as indicated by a number average molecular weight ($M_n$) of 10,000 to 50,000, and weight average molecular weight ($M_w$) of 10,000 to 1,000,000 or so but not more than 20 times the weight average molecular weight. $M_n$ is calculated from osmotic pressure measurements and $M_w$ is determined from measurements of light scattering in solution. However, the above range also applies when $M_w$ is determined in conventional manner on the basis of the intrinsic viscosity of the polymer in xylene solution as described in the Journal of Polymer Science 23, 887 (1957); the intrinsic viscosity is converted to molecular weight by means of the equation $$[\eta] = 1.05 \times 10^{-3} M_w^{0.63}$$

Another way of determining the suitability for use herein of ethylene/vinyl acetate copolymers having the required composition is by measurement of melt index, which to a large extent is a measure of molecular weight. The melt index (measured at 190° C.) will be in the range of 0.1 to 10 decigrams/minute, and for product of high strength will not be over 2 decigrams/minute. The melt range of about 1 to 2 decigrams/minute gives very good results, but higher molecular weight, even though less tractible, polymers in the melt index ranges such as 0.1 to 0.5 decigram/minute may ultimately prove more practical.

The proportions of ethylene and vinyl acetate product, respectively, in the copolymers utilized in the present invention is determined by analysis and it is believed that the product of each monomer is mainly present as copolymerizate in the copolymer. However, whether the contents resulting from the particular monomers are referred to as polymerizate, copolymerizate, or simply as "content," it will be understood that the terms are not used in a limiting sense but rather to identify the source of the material, whatever its actual polymeric structure in the polymer may be. The ethylene/vinyl acetate copolymers employed are characterized prior to orienting by elongations at break of at least 300% and preferably greater than 500%, and have tensile strengths at break greater (preferably by 100 to 200 p.s.i. or more) than their tensile strengths at yield, and exhibit the yield point and "necking-down" phenomenon characteristic of pliable crystalline polymers.

Copolymers of less than 10% vinyl acetate content cannot suitably be employed in the present invention as they are prone to break during the stretching procedure, while copolymers of more than 20% vinyl acetate content are too rubbery and do not hold their orientation readily, or have their tensile strengths particularly improved by orientation, this being specially the case in copolymers of greater than 25% to 30% vinyl acetate. Ethylene/vinyl acetate copolymers of 13 to 17% by weight vinyl acetate content are particularly suitable for use in the present invention. The foregoing percentages will vary to some extent with the molecular weight of the polymer. The ethylene/vinyl acetate copolymers herein consist essentially of ethylene and vinyl acetate copolymerizate in unhydrolyzed state, i.e., substantially none of the acetate groups have been removed and no substantial proportion of hydroxyl groups are present, as hydrolysis radically changes the copolymer properties; however, the use of copolymers containing any proportions of hydroxyl groups such as do not affect the conditions required for orientation or the desired properties of the oriented material can be considered as within the invention.

Polyethylene itself, i.e., the homopolymer of ethylene while fairly readily oriented uni-axially, cannot be oriented bi-axially or multi-axially with any substantial degree of success; when multi-axial orientation is attempted, orientation is obtained in small portions of the material, but rupture ordinarily occurs long before uniform orientation is even approached. By the present invention, however, it has become possible to have a clear, high strength, uniformly oriented film comprised largely of ethylene polymerizate.

The orienting process of the present invention is generally carried out at elevated temperatures above 25° C., but considerably below the melting point of the polymer, and generally in the range of 30° C. to 50–55° C., although somewhat higher temperatures can be employed when high stretching rates are used. Moreover, with copolymers in the 13% to 17% acetate content range, it is feasible not to heat at all, but in the range below 13% the drawing temperature is more critical. The copolymers are usually stretched at a rate of 50% to 5000% per minute, and rates of about 500% to 1000% per minute are generally preferred. To obtain a desirable degree of orientation, the copolymers should be stretched almost to their breaking elongation, say 70 to 90% of their breaking elongation under conditions suitable for effecting and maintaining orientation. In the practice of the present invention, the copolymers are usually stretched 300 to 1000% of their original length. To complete the orienting process, it is generally desirable to maintain the copolymer in the stretched condition under tension for a short period of time, at temperatures of the order of 40 to 60° C., the annealing temperature preferably being higher than the temperature employed during the stretching step. Annealing is necessary to obtain the maximum benefits of the orientation, although some of the benefits can be obtained even though the annealing step be omitted.

While the present invention is particularly directed to the production of clear, high strength films of ethylene/vinyl acetate copolymer, it will be understood that the orienting process can be employed with ethylene/vinyl acetate copolymer films, fibers, foils, monofilaments, tapes, ribbons, etc., of every kind and description so long as the ethylene/vinyl acetate copolymer has the required composition and properties as defined herein, and all such embodiments are considered within the invention.

The present invention is particularly concerned with bi- or multi-axial oriented films, in order to have films of high strength in both longitudinal and transverse directions, or preferably, to have high strength in all directions in the plane of the film. Such multi-axial orientation can be obtained by stretching in different directions either simultaneously or sequentially. Some of the advantages of orientation can be obtained by uniaxial stretching which can suitably be effected by stretching the material longitudinally. Longitudinal orientation may be particularly suitable for fiber and similar applications. In general, the percentages of stretch herein refer to the stretching in the direction under consideration only, and if bi-axial stretching is being effected, each of the transverse and longitudinal stretching will generally be in percentages in the aforementioned ranges although the total percentage cannot exceed the capabilities of the film. With reference to the breaking elongation of the copolymers, in the case of multi-axial orientation, the increase in area should be about 70% to 90% of the increase in area caused by longitudinally stretching the film to its breaking elongation; or, as an approximation, about 70% to 90% of the area increase effected by stretching the film in each of the longitudinal and transverse directions an amount equal to one-half of its breaking elongation. An area increase of about 1400% to about 1800% obtains the desired results, although the required amount of stretch depends to some extent on molecular weight and other factors; the specified area increase is particularly appropriate for ethylene/vinyl acetate copolymer containing 10–20% vinyl acetate of melt index 1 to 2, tensile strength of 2500 to 3500 p.s.i., and elongation of 700 to 1100%.

The amount of stretching along each of the axes will ordinarily be the same, but when the two axes are perpendicular to each other, it is possible to have a greater percentage of the stretching in one direction than the other, so long as the total area increase is about 70% to 90% of that possible, and so long as the stretching along each of the two axes has been effected evenly; it will, of course, be understood that when the stretching is unequal, the film will have greater strength along one axis than along the other—which is not undesirable for some applications.

In order to achieve uniform orientation without rupture, it is necessary to conform to the above-prescribed amounts of stretching or area increases. In one aspect the present invention involves stretching ethylene/vinyl acetate copolymer capable of substantial improvement by orientation, an amount sufficient to obtain substantially uniform stretching but not sufficiently close to the breaking point to cause a high percentage of failure. It will be understood that the permissible amount of stretching will vary to some extent with the conditions and that the use of higher temperatures may make it possible to achieve higher numerical percentages of stretching without rupture than those disclosed hereinabove, but subsequent relaxation would make the final percentage approximate those disclosed herein.

One of the most important aspects of the present invention is the fact that a film of see-through clarity is produced. It can readily be appreciated that for many wrapping and similar applications it is essential to have a film that is practically transparent and pleasing to the eye in that it is not cloudy or waxy in appearance. By the present invention, it is possible to obtain such films, for when ethylene/vinyl acetate copolymers containing 10 to 20% vinyl acetate are stretched and oriented according to the present invention, they lose their hazy appearance and become practically transparent. The explanation for this change in optical properties can be found in the change in the spherulite structure and surface smoothness (gloss) of the copolymer. If the unoriented copolymer is examined under an ordinary high-powered microscope, sperulites are readily visible. After the orientation is substantially complete, the spherulites are no longer visible under a microscope, indicating that they are now less than 2000 angstroms in size, and when orientation is complete the fact that the spherulites do not scatter light to any substantial degree indicates that they are in fact less than 400 angstroms in size.

Also, in the course of the orienting process, surface irregularities and roughness are smoothed out thus giving a new surface of outstanding gloss and luster.

*Example 1*

A high molecular weight ethylene/vinyl acetate copolymer of 16% by weight vinyl acetate content, and characterized by ultimate tensile strength of 2635 p.s.i., tensile strength to yield of 780 p.s.i., and ultimate elongation of 895%, was compression molded to obtain a disk 8" diameter by 0.042" thick. This disk was then subjected to radial stretching at a radial stretching speed of 7 inches/minute and at 40° C. in an apparatus with jaws adapted to grip the disk at regular intervals around its circumference and exert a stretching force, causing an equal increase in the radius at each of the gripping points. The sample was stretched to 16 times its original area and was then annealed at a temperature of 50° C. for about five minutes while held in its stretched position.

During the early part of the stretching procedure, it was noted by visual observation of grid markings placed upon the sample that the stretching was not occurring evenly, but rather some portions were being stretched to a great extent, while other portions were not being stretched at all; however, when the stretching procedure was completed, it was apparent that all portions of the film had been stretched substantially equally. The resulting clear, high strength film of 2½ mils thickness, in comparison with other films, had properties as follows:

|  | Unoriented Polyethylene | Unoriented Ethylene/Vinyl Acetate | Oriented Ethylene/Vinyl Acetate |
| --- | --- | --- | --- |
| Ultimate tensile strength, p.s.i.[4] | 1,565 | 2,635 | 9,790 |
| Ultimate elongation, percent | 425 | 895 | 185 |
| Tate-Emery Bursting-Strength, lbs | 12 | | 41 |
| Drop dart impact strength, gram-mil | 45.5 | 407 | *<488.8 |
| Clarity [1] | 44 | 48 | 96 |
| Haze [2] | 13 | 21 | 1.5 |
| Gloss [3] | 34 | 44 | 90 |

*A 1½ mil oriented film had impact strength of 550 grams/mil.
[1] Clarity is a measure of the ratio of light going directly through a material or only slightly deflected therein, to that scattered by the material, with the reading in air taken as 100 (measured in Clark-Tucker Wall Clarity Meter M-2).
[2] Gardner Haze is a measure of the amount of light diffused by the material (ASTM Method D1003-52).
[3] Gardner Gloss is a measure of the amount of light impinging on a material which is reflected at an angle from the surface greater than 60°; on a scale with black, polished glass as 100.
[4] Measured at a stretching speed of 5 inches/minute, essentially as described in ASTM D412-51T.

It will be noted that the properties of the specified oriented ethylene/vinyl acetate film are greatly superior to both the same ethylene/vinyl acetate in unoriented condition, and polyethylene. The oriented ethylene/vinyl acetate films of this invention are characterized by having a tensile strength of at least 5,000 p.s.i. along at least two axes and an ultimate elongation of from 100% to 300%. In addition to the remarkable improvement in tensile and impact strengths, attention is directed to the remarkably improved optical properties—much higher clarity and gloss, together with lower haze. With respect to the clarity, films for use as transparent wrapping materials should have clarity values better than 90 (on films of 3 mils thickness or less); the oriented ethylene/vinyl acetate film compositions described herein certainly have the required clarity values, while polyethylene and unoriented ethylene/vinyl acetate films are obviously deficient in clarity values. It is true that the clarity measurement of polyethylene can be greatly improved by intense refining, but such refining is not necessary to obtain high clarity with the oriented ethylene/vinyl acetate films. It was also noted that the oriented ethylene/vinyl acetate film had very high uninitiated tear strength.

The ethylene/vinyl acetate copolymer employed in the above example had a melt index of 1.09 decigrams/minute (measured at 190° C.) and intrinsic viscosity at 100° C. in xylene of 0.915 (measured at 0.1, 0.25, 0.35 and 0.50 weight percentages in xylene at 100° C. and extrapolated to zero concentration).

*Example 2*

The ethylene/vinyl acetate copolymer employed in Example 1 was compression molded into disks 8″ diameter by 0.042″ thickness at temperature of 310 to 320° F. The disks were then oriented by stretching at a radial speed of 7 inches/minute under conditions as indicated below to obtain film of the indicated properties. Five minutes was allowed for the disks to reach the stretching temperature prior to stretching.

| Sample No. | Stretching Temperature (° C.) | Final Radius (inches) | Annealing Temperature | Tensile (p.s.i.) | Elongation (percent) |
|---|---|---|---|---|---|
| 1 | (¹) | 10.5 | 50 | 7,128 | 258 |
| 2 | (¹) | 12.5 | 50 | 6,800 | 199 |
| 3 | 50 | 12.5 | 50 | 7,125 | 166 |
| 4 | 50 | 12.5 | 50 | 7,500 | 125 |
| 5 | 50 | 12.5 | 50 | 7,471 | 163 |

¹ Room temperature.

The use of higher temperatures, such as over 60° C., with the indicated stretching speed, generally leads to rupture of the material.

An etheylene/vinyl acetate copolymer composition of 6% vinyl acetate content ruptured when stretched under the conditions of Example 2. Efforts to orient an ethylene/vinyl acetate copolymer of 14% vinyl acetate content but of much lower molecular weight, as indicated by melt index of 7.81 and tensile strengths of 1481 p.s.i. and 652 p.s.i. at break and yield, respectively, were also unsuccessful, as the material ruptured.

*Example 3*

A group of 8-inch diameter disks of ethylene/vinyl acetate copolymer (10% by weight vinyl acetate, melt index of 1.1 decigrams/minute) were stretched under the following conditions:

| Sample No. | Stretching Temperature (° C.) | Final Radius (inches) | Annealing Temperature (° C.) | Stretch Speed (radial inch/minute) |
|---|---|---|---|---|
| 1 | 25 | 11.5 | 50 | 10 |
| 2 | 25 | 12.5 | 50 | 10 |
| 3 | 30 | 12.0 | 50 | 7 |
| 4 | 30 | 12.0 | 50 | 5 |

The stretched specimens were then tested for tensile strength and proved to have greatly improved tensile strengths.

In the following table, the load-bearing characteristics of multi-axially oriented ethylene/vinyl acetate (16% by weight vinyl acetate content) film are compared to those of the non-oriented blow extruded film.

| Static Load (p.s.i.) | Breaking Temperature, (° C.) | |
|---|---|---|
| | Oriented | Unoriented |
| 0 | 110 | 100 |
| 250 | 86 | 77 |
| 500 | 80 | 70 |
| 750 | 76 | 58 |
| 1,000 | 73 | 48 |

It will be noted that the load-bearing characteristics of the oriented film are appreciably higher than those of the unoriented film.

When higher molecular weight ethylene/vinyl acetate copolymer of 10 to 20% vinyl acetate content, e.g., 16% vinyl acetate, is uni-axially oriented under any of the conditions of Examples 1 or 2, e.g., a stretching speed of 14 inches/minute and temperature of 40° C., to obtain the required amount of elongation, e.g., 800%, the resulting uni-axially oriented ethylene/vinyl acetate has tensile strength along the axis of orientation of 20,000 p.s.i. or greater, although the strength in the transverse direction is far inferior.

It will be realized that the stretching operations described herein can be carried out by use of apparatus conventionally employed in the art such as rollers, spools, spindles and the like operated at differential speeds as may be necessary to effect the stretching; or by use of known mechanisms with jaws adapted to grip the material and effect stretching, which can be used alone or in combination with the foregoing; for example, it may be desirable to effect the longitudinal stretching by use of rollers, while transverse stretching is effected simultaneously or sequentially with the longitudinal stretching by the use of tender clips to grasp the edges of the material between the rollers and effect the stretching thereof. Suitable apparatus is disclosed and illustrated, for example, in United States Patent No. 2,823,421 to A. C. Scarlett, the disclosure of which is incorporated herein by reference.

What is claimed is:

A clear, multi-axially oriented annealed film of ethylene/vinyl acetate copolymer characterized by a tensile strength of at least 5,000 p.s.i along at least two axes obtained by stretching an ethylene/vinyl acetate copolymer of vinyl acetate content of about 10% to 20% by weight at temperatures of about 30° C. to 60° C., an amount equivalent to about 70% to 90% of its breaking point, and annealing the resulting film at about 40° C. to 60° C. while holding the said film in the stretched condition.

References Cited by the Examiner

UNITED STATES PATENTS 2,325,060 7/1943 Ingersoll _____ 8—115.5
2,728,941 1/1956 Alles et al. _____ 18—1
2,862,234 12/1958 Gerber _____ 18—15
3,114,736 12/1963 Bartl et al. _____ 260—87.3

OTHER REFERENCES

Twiss: Advancing Fronts in Chemistry, Reinhold Publishing Corp., N.Y. (1945), page 145.

JOSEPH L. SCHOFER, *Primary Examiner.*

H. WONG, *Assistant Examiner.*